April 22, 1924.
A. J. KONDROIK
DOOR SEAT
Filed June 8, 1923
1,491,144
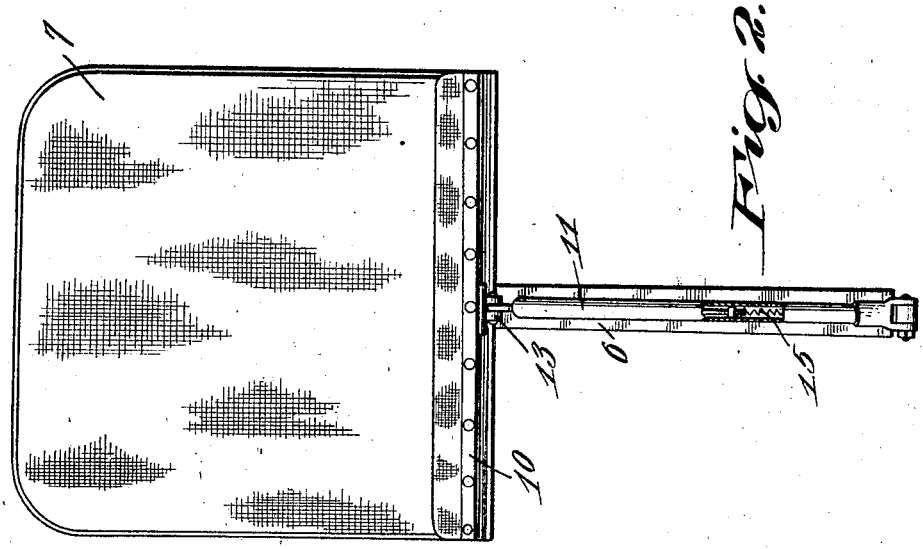
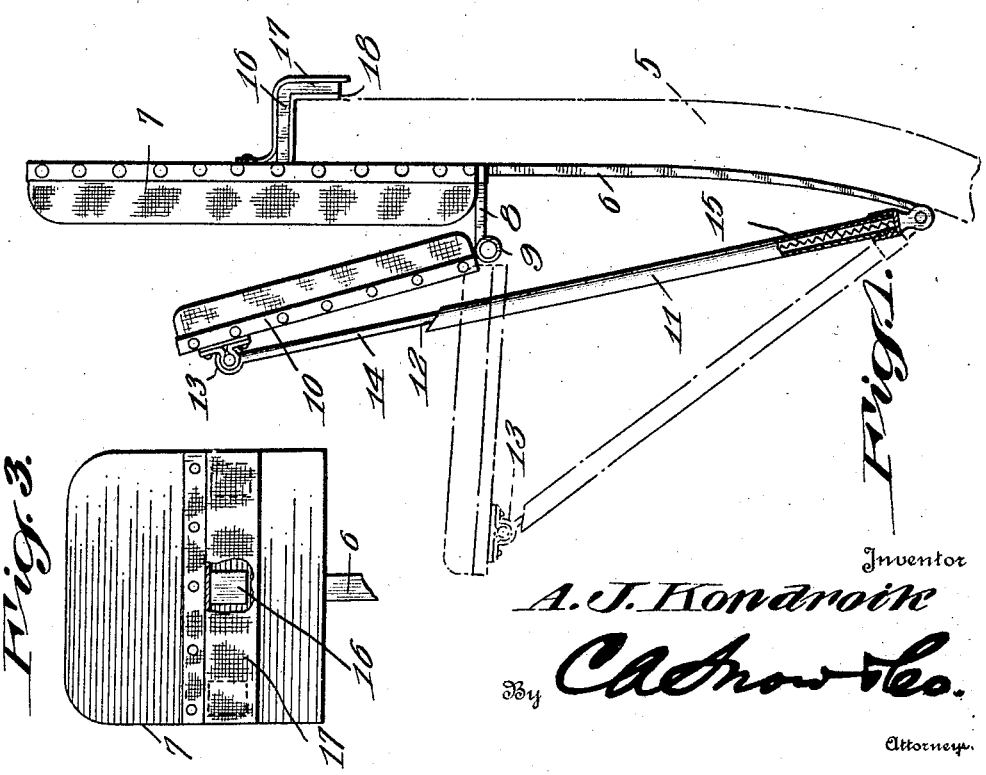
Inventor
A. J. Kondroik
By C. A. Snow & Co.
Attorneys Patented Apr. 22, 1924.

1,491,144

UNITED STATES PATENT OFFICE.

ALEXANDER J. KONDROIK, OF NEW ORLEANS, LOUISIANA.

DOOR SEAT.

Application filed June 8, 1923. Serial No. 644,192.

*To all whom it may concern:*

Be it known that I, ALEXANDER J. KONDROIK, a citizen of the United States, residing at New Orleans, in the parish of Orleans and State of Louisiana, have invented a new and useful Door Seat, of which the following is a specification.

This invention relates to auxiliary seats, and more particularly to auxiliary seats especially designed for use in connection with motor vehicles.

The primary object of the invention is to provide an auxiliary seat of the folding type, novel means being provided for automatically moving the seat portion to its inactive position when weight is removed therefrom.

Another object of the invention is to provide a foldable seat which may be hung and supported over a vehicle door so that the seat will be out of the way of persons passing to and from the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a seat constructed in accordance with the invention and showing the same as positioned over the door of a motor vehicle.

Figure 2 is a front elevational view of the seat in its active position.

Figure 3 is a rear elevational view of the securing brackets.

Referring to the drawing in detail, the reference character 5 designates a door of a motor vehicle which is curved in the usual manner and to which the auxiliary seat forming the subject matter of the present invention, is applied.

The seat includes a supporting bar 6 which is relatively long and to which the back portion 7 is secured, the back portion 7 being of a conventional type, the front surface thereof being padded for the comfort of the user.

Extending forwardly from the supporting bar 6, is a flange 8 to which the hinges 9 are secured, the hinges providing the connection between the plate and seat member 10 so that the seat member may move to a position in proximity to the back of the seat to provide a small and compact article for transportation.

Pivotally connected with the bar 6 at the lower ends thereof, is a tubular supporting member 11 which has its upper extremity inclined, so that the same will contact with the bearing 13 when the seat is in its active position, to support the seat against movement. Operating in the tubular supporting member 11 is a rod 14 that is pivotally supported in the bearings 13 and has its lower end contacting with the coiled spring 15 which is designed to normally urge the rod 14 from the tubular member and hold the seat 10 in its inactive position.

Bracket members 16 are secured to the back of the seat portion 7 and are in spaced relation with each other, the hook members being of a construction to fit over the upper edge of a door to support the seat in a manner to prevent movement thereof with respect to the door on which the same is positioned.

A flexible covering is indicated at 17 and is secured to the rear of the seat 7 the flexible cover normally lying over the brackets 16 to hide the same.

The bracket members 16 may have their inner surfaces covered as by means of a padding material 18 to insure against the bracket's marring or otherwise disfiguring the door to which the same is applied.

What is claimed as new is:—

An auxiliary seat including a supporting bar, a back rest at the upper end of the bar, bracket members supported by the back rest and adapted to fit over the door of a vehicle, a hinged seat section, a rod having connection with the seat section, a tubular member pivotally connected with the bar and adapted to receive the rod, and a coiled spring positioned in the tubular member and engaging the free end of the rod for normally urging the seat portion to its inactive position.

In testimony that I claim the foregoing as my own, I have hereto affixed my signature in the presence of two witnesses.

ALEXANDER J. KONDROIK.

Witnesses:
 M. E. TYNES,
 GEO. THURBER.